United States Patent [19]
Hirschfeld

[11] 3,721,834
[45] March 20, 1973

[54] STORED ENERGY REGULATING CIRCUIT

[75] Inventor: Robert A. Hirschfeld, Cupertino, Calif.

[73] Assignee: Lithic Systems, Inc., Cupertino, Calif.

[22] Filed: June 30, 1971

[21] Appl. No.: 158,378

[52] U.S. Cl. ....................307/235 R, 307/271, 331/111
[51] Int. Cl. ....................H03k 3/00
[58] Field of Search ........307/235, 271; 331/111, 115

[56] References Cited

UNITED STATES PATENTS

| | | | |
|---|---|---|---|
| 3,416,004 | 12/1968 | Taylor | 307/235 |
| 3,456,129 | 7/1969 | Burnett et al. | 307/235 X |
| 3,519,842 | 7/1970 | Furuishi et al. | 307/235 X |

*Primary Examiner*—John Zazworsky
*Attorney*—Limbach, Limbach & Sutton

[57] ABSTRACT

A three terminal electronic circuit having a negative resistance characteristic at its two input terminals that has application as an intermittently operated measuring circuit, an oscillator and other uses. A DC comparator circuit operates a power switch in series with a load in response to comparing the voltage at the input terminals with two distinct reference voltages, one reference voltage being utilized when the load power switch is off, and the other reference voltage being utilized when the load power switch is on. A load external of the circuit is connected between one of the input terminals and the circuit's third terminal. The load is operated from the input voltage to the circuit, thus requiring no separate power source for the load.

3 Claims, 9 Drawing Figures

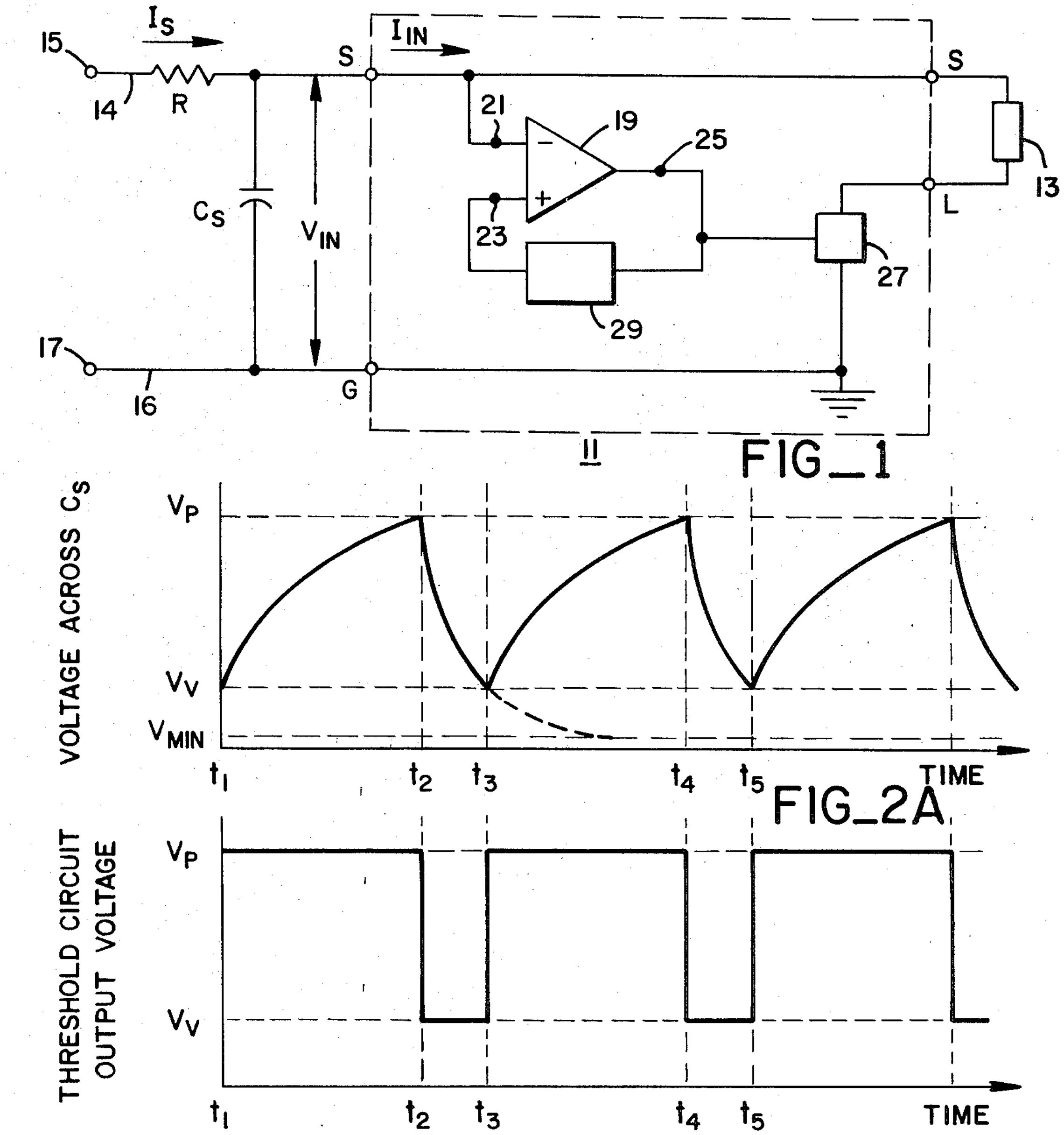
FIG_1 FIG_2A
FIG_2B
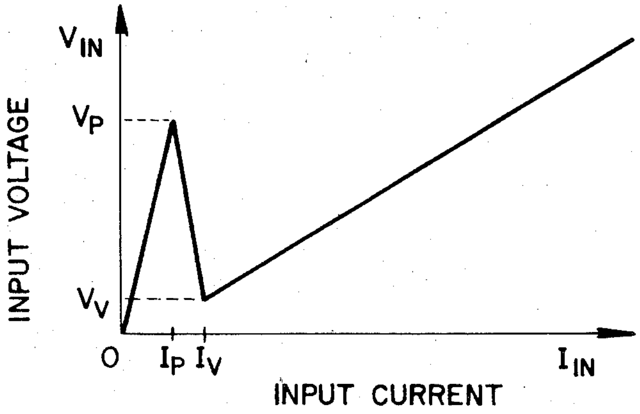
FIG_3
INVENTOR
ROBERT A. HIRSCHFELD

INVENTOR.
ROBERT A. HIRSCHFELD

STORED ENERGY REGULATING CIRCUIT

BACKGROUND OF THE INVENTION

This invention relates generally to electronic circuits and more specifically to those types of circuits which utilize a feedback loop.

Integrated circuits have the potential of great reductions in size and power requirements. However, integrated circuits have primarily been utilized as a means to reduce cost while, in most cases, the possibilities of equipment minaturization and a reduction of power requirements has not been realized. In battery operated equipment particularly, presently utilized integrated (monolithic) circuits still consume excessive power, thereby requiring minaturization of electronic packages to be controlled primarily by the size of battery sources. For low power applications, discrete components are still utilized because low power integrated circuits are often not available.

Therefore, it is a primary object of this invention to provide a three-terminal electronic circuit which may be constructed in an integrated circuit form and still have very low power consumption.

It is also an object of the present invention to provide an electronic circuit which exhibits a negative resistance characteristic at its input terminals.

It is a further object of the present invention to provide an electronic circuit in which accurate reference voltages are produced without the use of active voltage sources.

It is yet another object of the present invention to provide an electronic circuit with only three terminals for its input and output.

SUMMARY OF THE INVENTION

These and additional objects of the present invention are accomplished by an arrangement of electronic components which functions to compare the input voltage to the circuit with one of two reference voltages. The voltage comparison circuit controls a power switch which is connected across the input terminals in series with a load. When the load current switch is off, the highest of the two reference voltages is compared with the input voltage by the comparison circuit. When the input voltage rises to a level that is equal to or greater than the highest reference voltage, the load current switch is activated and the load is connected into the circuit. At this time, the lowest of the two reference voltages is compared with the input voltage by the comparison circuit. When the input voltage falls to a level approximately equal to this lowest reference voltage, the load current switch is caused to again turn off and the load is removed from the circuit.

By supplying the load with energy from the input to the circuit, the circuit may be constructed with only three external terminals. Two of the terminals are to the input of the circuit. The output of the circuit is between a third terminal and one of the input terminals. Since a load connected to the output of the circuit is driven by the power supply to the input of the circuit, no additional power source is needed for the load. With a load connected, the circuit according to the present invention will appear at its input terminals to have a negative resistance characteristic, a desirable feature for many applications.

Additional objects and advantages of the electronic circuit according to the present invention are set forth in the following description of a preferred embodiment that is illustrated in the accompanying drawings. The specific circuit illustrated is designed for construction in a monolithic form by known techniques. Since monolithic (integrated) circuits cannot always be produced economically with their components held within close tolerance, the specific circuit described hereinafter is designed so that the parameters of the various transistor and resistor elements may vary a great deal from the designed values without affecting the operation of the circuit as intended. Furthermore, the two reference voltages of the specific circuit are determined in part by a forward voltage drop across a plurality of diodes in series (rather than by a semiconductor breakdown voltage), thereby to provide more stable and accurate reference voltages.

These and other features and advantages will become more apparent upon a perusal of the following specification taken in conjunction with the accompanying drawings wherein similar characters of reference refer to similar structures in each of the several views.

BRIEF DESCRIPTION OF THE DRAWINGS

FIG. 1 shows the three-terminal circuit according to the present invention with an external load and input circuit connected thereto in a specific application thereof;

FIGS. 2A and 2B show voltage variations of the circuit of FIG. 1 as a function of time;

FIG. 3 shows the input voltage and current characteristics of the circuit according to FIG. 1 with the input resistor and capacitor omitted;

DESCRIPTION OF THE PREFERRED EMBODIMENT

Figures 4, 5, 6A, 6B, 7:
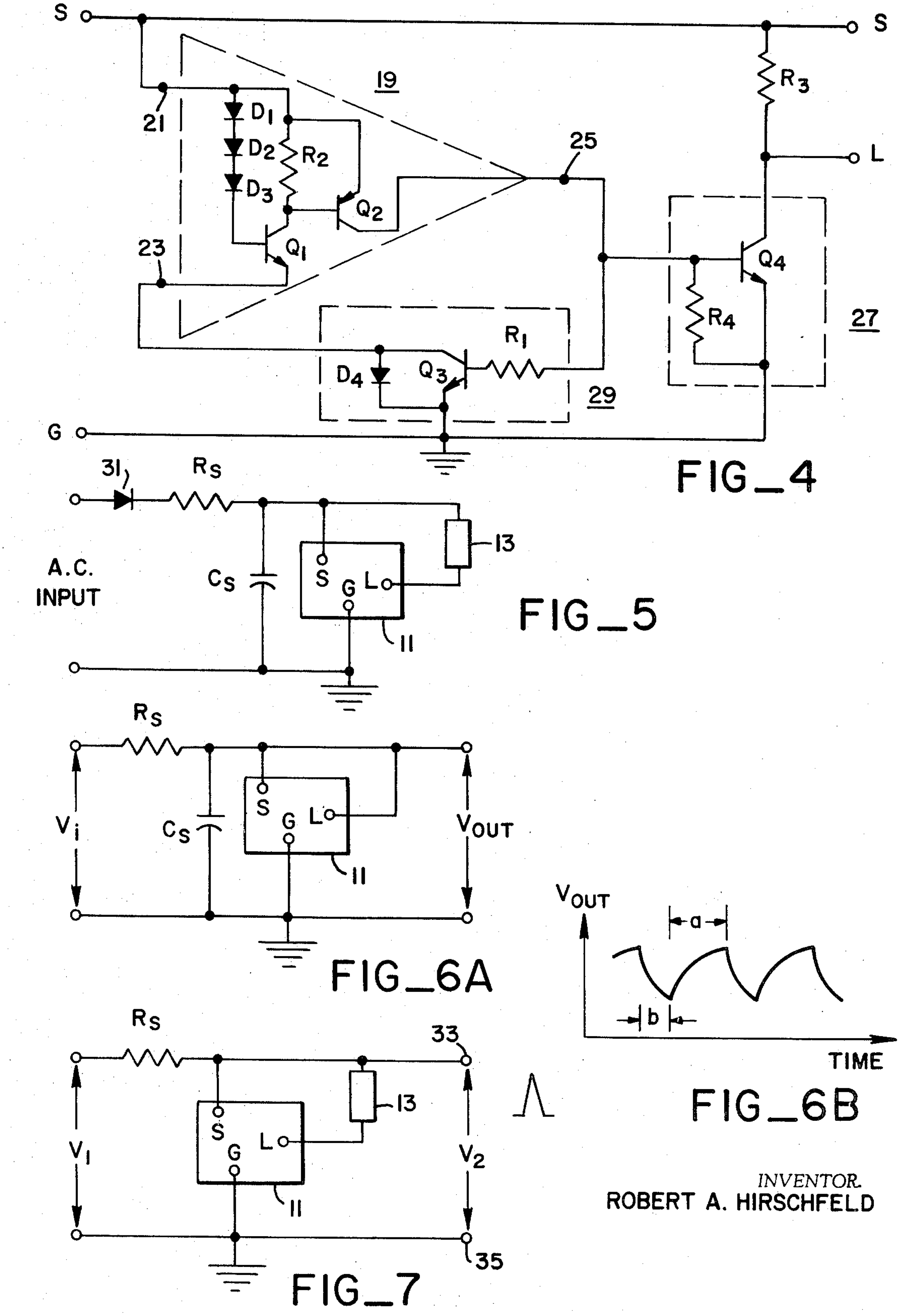
FIG. 4 is a detailed circuit diagram of the three-terminal circuit according to the present invention in one form.
FIG. 5 shows a modification of FIG. 1 wherein alternating currents serve as the input to the circuit.
FIG. 6A shows the use of the three-terminal circuit according to the present invention as an oscillator.
FIG. 6B shows a voltage waveform output of the oscillator according to FIG. 6A.
FIG. 7 shows an application of the three-terminal circuit of the present invention as a digital memory element.

Referring to FIG. 1, a three-terminal electronic circuit 11 is shown enclosed by the dashed lines. The circuit 11 has input terminals S and G. A load 13 is connected between the third terminal L of the circuit 11 and the input terminal S. In the particular use of the circuit 11 that is shown in FIG. 1, a storage capacitor $C_s$ is connected across the input terminals S and G by connection to input lines 14 and 16 respectively connected between input terminals S and G and a pair of connection terminals 15 and 17. When in use, a DC voltage is impressed across terminals 15 and 17, thereby driving a current through the capacitor $C_s$ and a resistor $R_s$ in series in line 14 between the terminal 15 and a connection to the capacitor $C_s$. The impedance of the circuit 11 and the load 13 as it appears from the input terminals S and G is made high so that most of the current $I_s$ which passes through the resistor $R_s$ goes through the capacitor $C_s$ and contributes to building up a stored energy charge in the capacitor $C_s$.

The purpose of the circuit 11 as shown in the specific application of FIG. 1 is to connect the load 13 across the capacitor $C_s$ for a time when the voltage across the capacitor $C_s$ has reached a certain high predetermined reference threshold value, designated herein as $V_p$. As the energy then stored in the capacitor $C_s$ is consumed by the load 13, the voltage across $C_s$ will decrease. Another purpose of the circuit 11 is to disconnect the load 13 from the capacitor $C_s$ when the capacitor voltage has reached a certain low predetermined reference threshold voltage level, designated herein as $V_v$. With the circuit 11 acting in this way, a very small direct current voltage may be monitored when connected across the terminals 15 and 17. A small current $I_s$, much smaller than that current desired for load 13, serves to store energy in the capacitor $C_s$ which is periodically discharged into the load 13.

An example of the use of a circuit such as that shown in FIG. 1 is where the load 13 is a light emitting diode and the terminals 15 and 17 are connected to a voltage that is desired to be monitored. Without unduly loading down the circuit in which the voltage is to be monitored with a light emitting diode connected directly thereto, the circuit of FIG. 1 draws off a very small current $I_s$ that does not disturb the circuit being monitored. When this small current has charged the capacitor $C_s$ to a voltage approximately equal to the highest threshold voltage $V_p$, the circuit 11 momentarily connects the load 13, such as a light emitting diode, across the capacitor $C_s$. The charge stored in the capacitor $C_s$ is then discharged through the load 13. When the voltage across the capacitor $C_s$ drops to a value approximately equal to the lowest threshold voltage $V_v$, the circuit 11 disconnects the load 13 from across the capacitor $C_s$. In this manner, the small current $I_s$ taken from the circuit being monitored will be at a uniform value while the voltage across $C_s$ increases and decreases, intermittently firing a light emitting diode or other load 13. The rate at which the load 13 is fired is indicative of the voltage at terminals 15 and 17.

The three-terminal circuit 11 is shown in functional block diagram form in FIG. 1. A DC comparator 19 has two inputs, a first (inverting) input 21 and a second (non-inverting) input 23. An output 25 of the DC comparator 19 is connected to and drives a load current power switch 27. The switch 27 is additionally connected between the input terminal G and the output terminal L for turning load current on and off in response to the signal at the comparator output 25. A threshold reference voltage circuit 29 is also connected to and controlled by the output 25 of the DC comparator 19.

The inverting input 21 of the comparator 19 is connected with the input terminal S of the three-terminal device 11. Therefore, the voltage at the inverting input 21 rises and falls with the voltage across the capacitor $C_s$. The non-inverting input 23 of the comparator 19 is connected with the threshold reference voltage circuit 29. The threshold reference circuit 29 develops for the non-inverting input 23 either a high threshold voltage $V_p$ or a low threshold voltage $V_v$, depending upon whether the load current control switch 27 is off or on, respectively.

Consider an operation of the circuit shown in FIG. 1 wherein the non-inverting input 23 of the comparator 19 is initially impressed with the higher threshold voltage $V_p$ from the reference voltage circuit 29. Consider a small current $I_s$ flowing into the circuit of FIG. 1 from a voltage impressed across the terminals 15 and 17. A current flow $I_s$ will cause the voltage across the capacitor $C_s$ to slowly build up, as indicated in FIG. 2A, between times $t_1$ and time $t_2$. At time $t_2$ when the voltage across the capacitor $C_s$ has reached a value equal to $V_p$, the voltages at the comparator inputs 21 and 23 are equal. At this point, the output voltage 25 of the comparator 19 goes from a positive value to a negative value. This turns on the switch 27, which is preferably an appropriate semiconductor device. At the same time, the threshold references voltage circuit 29 is switched so that its output to the non-inverting input 23 of the comparator 19 is changed from its high threshold level $V_p$ to its low threshold level $V_v$. The output voltage of the threshold circuit 29 is shown as a function of time in FIG. 2B. Referring to FIG. 2A, it is seen that after time $t_2$ when the load 13 has been switched to a parallel relationship with the capacitor $C_s$, that the capacitor $C_s$ discharges through the load 13 and, therefore, its voltage decreases.

As the voltage across $C_s$ decreases, the voltage at the inverting input 21 of the comparator 19 must also decrease. When this voltage reaches a level equal to $V_v$, the inputs 21 and 23 of the comparator 19 are again at equal voltage levels. The comparator 19 then operates to switch its output 25 from a negative value to a positive value. This disconnects the load 13 from the circuit and restores the threshold circuit 29 to deliver an output voltage of $V_p$ to the non-inverting input 23. The cycle now begins again with the capacitor $C_s$ being charged by the small input current $I_s$.

The load 13 is switched out of the circuit before the voltage across the capacitor $C_s$ reaches a minimal value $V_{min.}$ because the more gradual portion of a capacitor discharge characteristic is less useful than the rapid discharge portion. It may be noted that if $V_v$ were not set higher than $V_{min.}$, the capacitor $C_s$ would discharge until it reached the value $V_{min.}$ and would stay there. A value of $V_{min.}$ would be determined by the input current $I_s$ and the impedance of the load 13.

The input voltage-current characteristic of the circuit of FIG. 1 is of interest for many general applications of the three-terminal circuit 11. Such voltage current characteristics are illustrated in FIG. 3 for the circuit of FIG. 1 with the capacitor $C_s$ and the resistor $R_s$ omitted. The load 13, however, is included. The curve of FIG. 3 shows the relationships of $I_{in}$ and $V_{in}$ indicated at FIG. 1. The circuit is then a two-terminal (S and G) circuit.

Referring to FIG. 3, it is seen that this two-terminal device is essentially an open circuit at low voltages. As the voltage increases toward $V_p$, however, the inverting input of the comparator 19 of FIG. 1 begins to consume a small amount of bias current, therefore presenting a high impedance. At the voltage $V_p$, the current input is $I_p$. It will be noted that the two-terminal device then has a negative resistance characteristic between the input current values $I_p$ and $I_v$. As the current increases beyond $I_v$, the input voltage increases at a much lower slope than before because the load 13 is now in the circuit.

A specific form of the three-terminal network 11 is shown in detail in FIG. 4 which internally generates a high threshold voltage $V_p$ of about 2.2 volts and a low threshold voltage $V_v$ of about 1.5 volts. These threshold voltages are not determined by breakdown mechanisms, as is sometimes done in other equipment, and therefore results in an electronic circuit having negative resistance characteristics that are capable of operating at a low voltage. These specific threshold voltages may be varied, as discussed thereinafter, but have been selected for their compatability with the requirements of Gallium-Arsenide-Phosphide light emitting diodes for connection as the load 13.

Referring to FIG. 4, the DC comparator 19 contains an NPN transistor Q1 and a PNP transistor Q2. A plurality of diodes D1, D2 and D3 are connected in series with the inverting input 21 and a base connection of the transistor Q1. The collector of the transistor Q1 is connected with the base of the transistor Q2. The emitter of the transistor Q2 is connected with the inverting input 21 of the comparator 19. The emitter of the transistor Q1 is connected with the non-inverting input 23. The collector of the transistor Q2 comprises the output 25. A resistor $R_2$ is a leakage preventing resistor which serves as a collector load for the transistor Q1.

The threshold reference voltage circuit 29 includes an NPN transistor Q3 having its collector and emitter shunted across a diode $D_4$. The collector is also connected with the non-inverting input 23 of the comparator 19. The emitter of the transistor Q3 is connected to the G input terminal of the circuit. The base of the transistor Q3 is connected through a series resistance $R_1$ to the output 25 of the comparator 19. $R_1$ is a limiting resistor to assure that most of the current from the output 25 of the comparator 19 goes into the load current switch 27 rather than into the threshold reference voltage circuit 29.

The load control switch 27 includes an NPN transistor $Q_4$ with its base driven by the output 25 of the comparator 29. The collector of the transistor $Q_4$ is connected to the third terminal L of the circuit which may itself be connected to an external load. The emitter of the transistor $Q_4$ is connected to ground. It may be seen that when the output 25 of the comparator 19 goes from positive to negative, the transistor $Q_4$ becomes saturated and thus forms a substantially short circuit between its collector and ground and thus places a load connected at the terminals S and L in parallel with the input terminals S and G.

A resistor $R_4$ is connected between the base and emitter of the transistor $Q_4$ which shunts leakage current of the transistor $Q_2$ to ground. The resistor $R_4$ is not necessary in certain circumstances but it is desirable by tending to guarantee fast switching of the transistor $Q_4$. A resistance $R_3$ is connected between the third terminal L and the combined output/input terminal S to serve as a nominal load so that the circuit will be operable without an external load.

The high threshold voltage $V_p$ is determined by the sums of the forward voltage drops of the diodes $D_1$, $D_2$, and $D_3$, as well as the voltage drop between the base and emitter of the transistor $Q_1$, and additionally the forward voltage drop of the diode $D_4$. A number of diodes utilized will increase or decrease depending upon the specific threshold voltages desired. When the output voltage 25 of the comparator 19 goes to a negative value, the transistor $Q_3$ saturates at the same time that the switching transistor $Q_4$ saturates. Therefore, when a load is connected into the circuit, the diode $D_4$ is shunted by the lower resistance of the collector-emitter path of the transistor $Q_3$. The threshold voltage applied to the non-inverting input 23 of the comparator 19 under these circumstances is lower than the threshold voltage $V_p$ by the difference between the forward voltage drop of $D_4$ and the saturation voltage between the collector and emitter of the transistor $Q_3$. Therefore, the lower threshold voltage $V_v$ is determined by the sum of the voltages developed across the diodes $D_1$, $D_2$, $D_3$ and the base-emitter path of the emitter path $Q_1$, since the saturated transistor $Q_3$ presents substantially a short circuit across the diode $D_4$.

The load 13 of FIG. 1 that is connected to the three-terminal circuit 11 may be most anything depending upon the specific application of the circuit 11. The load 13 may be, for instance, a resistive load, an electromechanical device for doing useful work, the primary of a transformer or a magnetic tape recording erase head. The use of a light emitting diode as the load 13 in conjunction with the three-terminal circuit 11 to form an indicating device has already been discussed.

Particular values of components for the three-terminal circuit 11 as shown in FIG. 4 can be made as follows to form an operable circuit:

$D_1$, $D_2$, $D_3$, $D_4$: Any commercially available silicon semiconductor diode.

$Q_1$, $Q_3$, $Q_4$: CA3046 monolithic transistor array circuit board available commercially from RCA.

$Q_2$: 2N2906 PNP transistor.

$R_1$: 5,000 ohms, one-fourth watt carbon.

$R_2$: 100,000 ohms, one-fourth watt carbon.

$R_3$: 2,700 ohms, one-fourth watt carbon.

$R_4$: 100,000 ohms, one-fourth watt carbon.

These specific component values are not, however, critical ones. As discussed hereinabove, an advantage of the specific circuit of FIG. 4 is that the components may vary widely in characteristics and still form a circuit which operates in the desired manner. For instance, the values of the resistors may differ by 50 percent or more from the values stated above without significantly affecting the operation of the circuit. This is an advantage of the circuit of FIG. 4 which allows it to be produced in an integrated form. The circuit can thus be produced inexpensively.

The three-terminal circuit of the present invention has numerous specific applications in addition to those already discussed. For instance, with respect to FIG. 5, the three-terminal circuit 11 is used to measure magnitude of an alternating current signal which may, as a specific example, be in the radio frequency range. The load 13 of FIG. 5 is preferably a light emitting diode. A diode 31 is inserted in the input circuit so that the three-terminal circuit 11 receives only direct current.

Another application of the three-terminal circuit 11 is shown in FIG. 6A wherein the output terminal L is electrically connected with the input terminal S. The circuit 11 then has a zero impedance load and appears as a true two-terminal network. The circuit of FIG. 6A is a negative resistance type of oscillator. A driving voltage $V_i$ is impressed at the input of the circuit to result in a $V_{out}$ which has a waveform such as that shown in FIG. 6B. The width of *a* of each of the output pulses may be varied by varying the current through the capacitor $C_s$ of FIG. 6A. The time *b* between pulses remains constant for all values of current which are used to charge the capacitor $C_s$.

The current through the capacitor $C_s$ of FIG. 6A may be controlled in any of a number of ways, such as by controlling the resistance $R_s$ when $V_t$ is a constant direct current voltage. This suggests an application of the circuit of FIG. 6A wherein the resistance $R_s$ is a resistance type of transducer such as a thermistor or photocell which would result in the pulsating voltage $D_{out}$ being a digital representation of the condition being measured.

FIG. 7 shows the three-terminal circuit 11 connected for use as a memory element. A constant voltage $V_1$ is applied to the input of the circuit. The voltage $V_1$ is made to have a value somewhere between the higher threshold voltage $V_p$ of the circuit 11 and the lower threshold voltage $V_v$ of that circuit. The output voltage $V_2$ across terminals 33 and 35 can be either one of two values, depending upon whether the three-terminal circuit 11 is in its $V_p$ state or its $V_v$ state. The circuit may be used to store information concerning a recent voltage pulse applied between the terminals 33 and 35. A second voltage pulse is applied to these terminals to read-out the binary state of the circuit 11. If this voltage pulse has a magnitude greater than the threshold voltage $V_p$ of the circuit 11, the circuit either remains in its "on" state at the lower threshold voltage $V_v$ or will be switched to that state. Similarly, if the second voltage pulse is less than the lower threshold voltage $V_v$ of the circuit 11, the circuit will either remain in its "off" state at the higher threshold value $V_p$ or will be switched thereto. If switching occurs from one state to another between two successive pulses, then these pulses must be of different values of voltage.

The present invention has been described in detail in its preferred embodiments without the intention of limiting its scope which is defined by the appended claims.

What is claimed is:

1. A three terminal electrical integrated circuit formed only of resistive and semiconductor components, comprising:

first and second terminals forming an input to the circuit, and said first and a third terminal forming an output for connection of a load thereto, a load current switch having conductive and non-conductive states, said switch being connected between said second and third terminals, a voltage comparison circuit operably connected to said load current switch for changing the state of said switch, said comparison circuit including first and second inputs with said first input connected to said first terminal, said comparison circuit characterized by making said load current switch conductive when the voltage of said first input is equal to or greater than the voltage of said second input, said comparison circuit additionally being characterized by making said load current switch non-conductive when the voltage of the first input is less than the voltage of the second input, and a threshold generating means responsive to said comparison circuit for establishing a first reference voltage at the second input of said comparison circuit when the load current switch is in its non-conductive state and for establishing a second reference voltage at the second input of said comparison circuit when the load current switch is in its conductive state, said first reference voltage being higher than said second reference voltage, and additionally said first and second reference voltages being determined by a plurality of forward biased diodes connected in a series current path extending between said first and second terminals.

2. An electrical circuit, comprising:

first and second input terminals, a load current switch having conductive and non-conductive states, a pair of output terminals for attachment to an electrical load, said output terminals being connected to place an electrical load attached thereto in series with said load current switch with the series combination connected across said first and second terminals, a voltage comparison circuit operably connected to said load current switch for changing the state of said switch, said comparison circuit including first and second inputs with said first input connected to said first terminal, said comparison circuit characterized by making said load current switch conductive when the voltage of said first input is equal to or greater than the voltage of said second input, said comparison circuit additionally being characterized by making said load current switch non-conductive when the voltage of the first input is less than the voltage of the second input, said voltage comparison circuit including a transistor with its base terminal connected with said first input through at least one semiconductor diode, the emitter terminal of said transistor being connected to said second input, a threshold generating means responsive to said comparison circuit for establishing a first reference voltage at the second input of said comparison circuit when the load current switch is in its non-conductive state and for establishing a second reference voltage at the second input of said comparison circuit when the load current switch is in its conductive state, said first reference voltage being higher than said second reference voltage, said threshold generating means includes at least one diode connected between said second input of the voltage comparison circuit and said second input terminal, said at least one threshold generating means diode being shunted by the collector and emitter of a transistor.

3. An electrical circuit, comprising:

a two conductor input circuit, a load current switch having conductive and non-conductive states, means for connecting an electrical load and said load current switch in a series circuit across said two conductor input circuit, and a voltage comparison circuit with an output operably connected to said load current switch for changing the state of said switch and an input connected to compare the voltage of said input circuit with that of a reference voltage circuit, said comparison circuit causing said load current switch to become conductive when the voltage of said input circuit is equal to or greater than the voltage of said reference voltage circuit, said comparison circuit additionally causing said load current switch to become non-conductive when the voltage of said input circuit is less than the voltage of said reference voltage circuit, said reference voltage circuit including a plurality of semiconductor diodes connected in a series circuit extending across said two conductor input circuit in a manner that the reference voltage sensed by the comparison circuit is a forward voltage drop across at least one of said diodes while another of said series circuit diodes is shunted by a switch that is operably connected to the output of the voltage comparison circuit in a manner to form a substantial short circuit across said another diode when said load current switch is conductive and to form a substantial open circuit across said another diode when said load current switch is non-conductive, thereby to cause the reference voltage to cycle between high and low values as said switch cycles respectively between its non-conductive and conductive states.

* * * * *